US008559005B2

(12) United States Patent
Shimbo et al.

(10) Patent No.: US 8,559,005 B2
(45) Date of Patent: Oct. 15, 2013

(54) SPECTRAL CHARACTERISTIC MEASURING DEVICE AND IMAGE FORMING APPARATUS

(71) Applicants: Kohei Shimbo, Kanagawa (JP); Naohiro Kamijo, Kanagawa (JP); Manabu Seo, Kanagawa (JP); Yoichi Kubota, Tokyo (JP)

(72) Inventors: Kohei Shimbo, Kanagawa (JP); Naohiro Kamijo, Kanagawa (JP); Manabu Seo, Kanagawa (JP); Yoichi Kubota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/737,157

(22) Filed: Jan. 9, 2013

(65) Prior Publication Data

US 2013/0182251 A1 Jul. 18, 2013

(30) Foreign Application Priority Data

Jan. 12, 2012 (JP) ................................. 2012-003687

(51) Int. Cl.
*G01J 3/28* (2006.01)

(52) U.S. Cl.
USPC ........................................................ 356/328

(58) Field of Classification Search
USPC .................................. 356/302, 326, 328, 334
See application file for complete search history.

(56) References Cited

U.S. PATENT DOCUMENTS

| 5,905,571 | A | * | 5/1999 | Butler et al. .................. 356/328 |
| 7,973,928 | B2 | | 7/2011 | Iwane |
| 2011/0063615 | A1 | | 3/2011 | Shimbo et al. |
| 2011/0106472 | A1 | | 5/2011 | Seo et al. |
| 2011/0222056 | A1 | | 9/2011 | Seo et al. |
| 2011/0299104 | A1 | | 12/2011 | Seo et al. |
| 2011/0317149 | A1 | | 12/2011 | Shimbo et al. |

FOREIGN PATENT DOCUMENTS

| EP | 1344193 B1 | 7/2007 |
| JP | 2008-256594 | 10/2008 |
| JP | 2011-191158 | 9/2011 |

OTHER PUBLICATIONS

Tsumura et al. "Estimation of Spectral Reflectances from Multi-Band Images by Multiple Regression Analysis" *KOUGAKU* vol. 27, No. 7 (1998), pp. 384-391.
U.S. Appl. No. 13/559,982, filed Jul. 27, 2012, Shimbo et al.

* cited by examiner

*Primary Examiner* — Tarifur Chowdhury
*Assistant Examiner* — Abdullahi Nur
(74) *Attorney, Agent, or Firm* — IPUSA, PLLC (57) ABSTRACT

A spectral characteristic measuring device includes an illuminating unit that illuminates a medium; a light dividing unit that divides reflection light from the medium into reflection light beams; a first imaging unit that includes first lenses and second lenses arranged alternately in a staggered pattern and focuses the respective reflection light beams; a diffraction unit that includes a first diffraction region and a second diffraction region and diffracts the focused reflection light beams to form diffraction images; and a light receiving unit that includes plural pixels for receiving the diffraction images. The reflection light beams focused by the first lenses enter the first diffraction region to form first diffraction images, the reflection light beams focused by the second lenses enter the second diffraction region to form second diffraction images, and the first and second diffraction images are arranged alternately on the light receiving unit in a pixel arrangement direction.

11 Claims, 10 Drawing Sheets

FIG.10

SPECTRAL CHARACTERISTIC MEASURING DEVICE AND IMAGE FORMING APPARATUS

CROSS-REFERENCE TO RELATED APPLICATION

The present application is based upon and claims the benefit of priority of Japanese Patent Application No. 2012-003687, filed on Jan. 12, 2012, the entire contents of which are incorporated herein by reference.

BACKGROUND OF THE INVENTION

1. Field of the Invention

An aspect of this disclosure relates to a spectral characteristic measuring device and an image forming apparatus including the spectral characteristic measuring device.

2. Description of the Related Art

There is a demand for full-color, electrophotographic/inkjet image forming apparatuses (e.g., printers and copiers) that can print high-quality color images on recording media such as paper. Accordingly, improving color reproducibility is one of the most important technical goals. To achieve such a technical goal, for example, spectral characteristic measuring devices including an array of spectral sensors have been proposed.

For example, Japanese Laid-Open Patent Publication No. 2008-256594 discloses a spectral characteristic measuring device including an array of spectral sensors. In the spectral characteristic measuring device, components such as lenses, apertures, and diffraction gratings are arranged one- or two-dimensionally on plural glass substrates and the glass substrates are joined at appropriate intervals to form a spectral sensor array.

With the configuration of the related-art spectral characteristic measuring device, however, the apertures of optical systems of the spectral sensor array cannot be made greater than the array pitch of the spectral sensors and as a result, diffraction images obtained by the spectral sensors become relatively dark. This in turn makes it necessary to provide relatively-long exposure time to achieve desired accuracy and therefore makes it difficult to measure spectral characteristics at high speed.

SUMMARY OF THE INVENTION

In an aspect of this disclosure, there is provided a spectral characteristic measuring device that includes an illuminating unit configured to illuminate a medium; a light dividing unit configured to divide reflection light from the medium into plural reflection light beams; a first imaging unit configured to focus the respective reflection light beams; a diffraction unit configured to diffract the focused reflection light beams to form diffraction images; and a light receiving unit including plural pixels configured to receive the diffraction images. The first imaging unit includes first lenses and second lenses that are arranged alternately in a staggered pattern, and the diffraction unit includes a first diffraction region and a second diffraction region. The spectral characteristic measuring device is configured such that the reflection light beams focused by the first lenses enter the first diffraction region to form first diffraction images of the diffraction images, the reflection light beams focused by the second lenses enter the second diffraction region to form second diffraction images of the diffraction images, and the first diffraction images and the second diffraction images are arranged alternately on the light receiving unit in a pixel arrangement direction in which the pixels are arranged.

DESCRIPTION OF THE PREFERRED EMBODIMENTS

Preferred embodiments of the present invention are described below with reference to the accompanying drawings. Throughout the accompanying drawings, the same reference numbers are used for the same components, and overlapping descriptions of those components may be omitted.

<First Embodiment>

Figure 1:
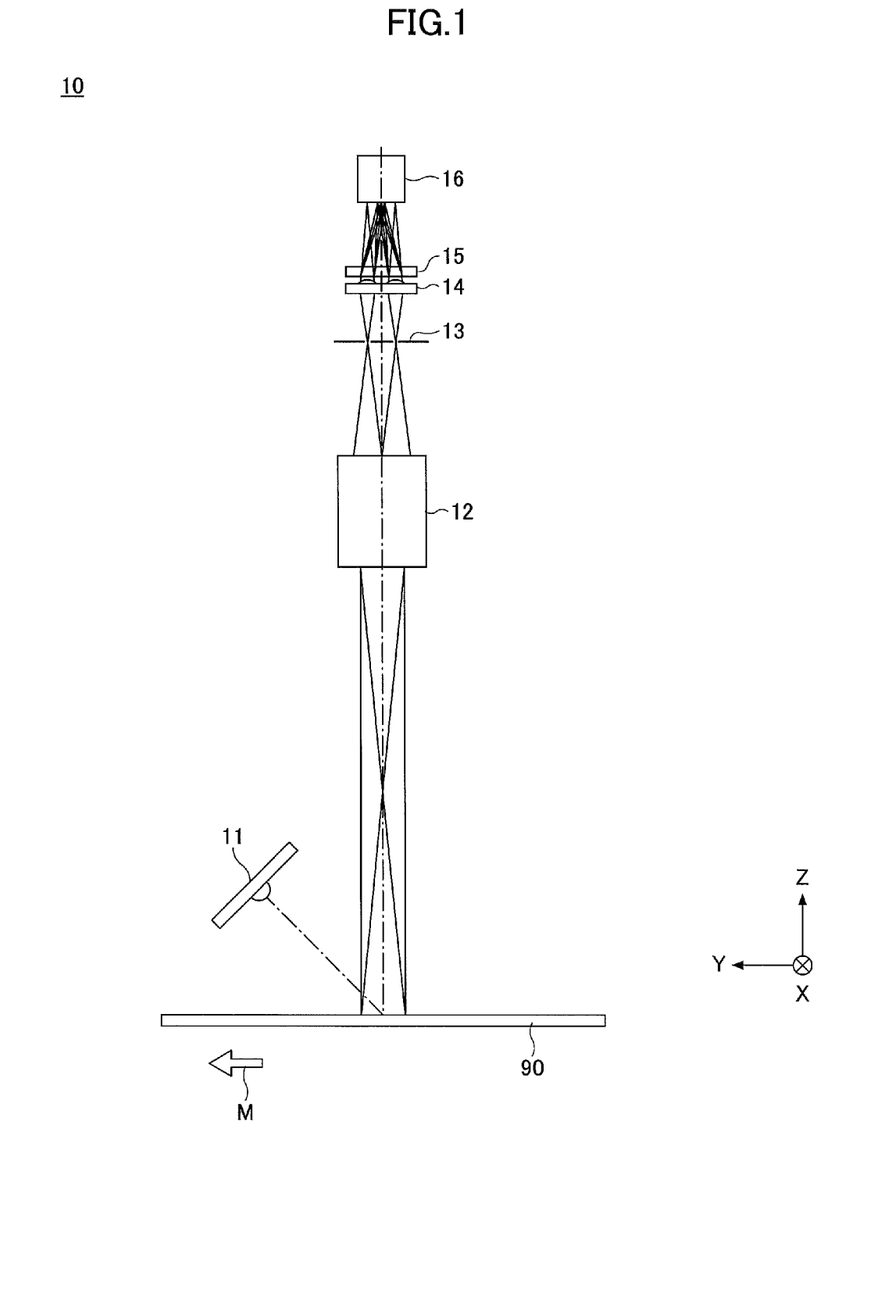
FIG. 1 is a schematic diagram of a spectral characteristic measuring device according to a first embodiment.

FIG. 1 is a schematic diagram of a spectral characteristic measuring device 10 according to a first embodiment. In the descriptions below, "X-direction", "Y-direction", and "Z-direction" indicate axial directions (or directions of arrows) illustrated in the drawings. Also in the present application, "spectral characteristics" indicate the intensity of diffuse reflection light that is expressed as a function of wavelength, and include spectral reflectance. Spectral reflectance is expressed as a function of wavelength and indicates the ratio of the intensity of diffuse reflection light from a target object (an object to be measured) to the intensity of diffuse reflection light from a reference plate (e.g., a white plate).

Referring to FIG. 1, the spectral characteristic measuring device 10 includes a line illumination source 11, an imaging optical system 12, a hole array 13, an imaging optical system 14, a diffraction unit 15, and a line sensor 16. A reference number "90" indicates a medium for carrying an image, i.e., a target object. An image is formed in an area on the medium 90. The medium 90 is, for example, a sheet of printed paper and can be conveyed at a constant speed in a direction indicated by an arrow M in FIG. 1 (i.e., in the Y-direction).

In the descriptions below, specular reflection light indicates light reflected from the medium 90 at the same angle as the incident angle and in a direction opposite to the incident direction of illuminating light emitted from the line illumination source 11 (i.e., reflected light with a reflection angle of π−θ where θ indicates the incident angle), and diffuse reflection light indicates reflected light other than the specular reflection light.

The line illumination source 11 illuminates a line-shaped area that extends in the width direction (the X-direction) of the medium 90. For example, the line illumination source 11 may be implemented by a white light-emitting diode (LED) array that can emit light with intensity in substantially the entire visible light range. Alternatively, the line illumination source 11 may be implemented by a cold-cathode fluorescent lamp or any other appropriate lamp.

Preferably, the line illumination source 11 is configured to emit light with a wavelength range that is necessary for dispersion and is capable of evenly illuminating the entire observation area (a line extending in the X-direction on the medium 90). The line illumination source 11 is an example of an illuminating unit of the present embodiment.

A collimating lens may be provided in the optical path between the line illumination source 11 and the medium 90 to substantially collimate or focus light emitted from the line illumination source 11 and thereby illuminate a line-shaped area on the medium 90.

The imaging optical system 12 focuses diffuse reflection light, which is reflected from the medium 90 in the normal direction (the Z-direction), on apertures of the hole array 13. For example, the imaging optical system 12 may be implemented by a condenser lens array including plural lenses arranged in the X-direction.

However, it is not absolutely necessary that the diffuse reflection light is precisely focused on the apertures of the hole array 13. That is, the diffuse reflection light may be defocused or at infinity. Also, the imaging optical system 12 may be implemented by a gradient index lens array, a microlens array, or mirrors.

Figure 2A:
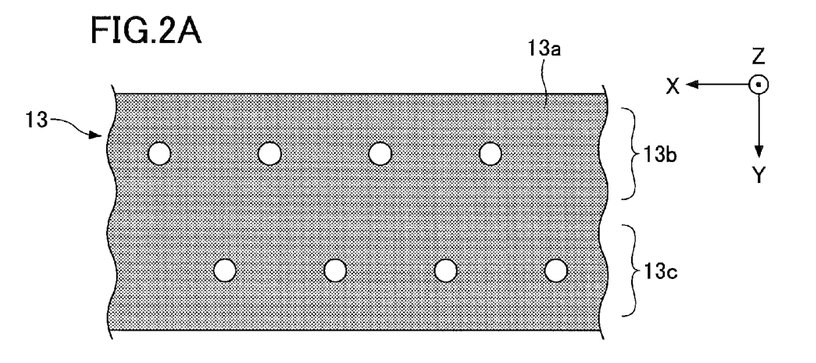
FIGS. 2A through 2C are drawings illustrating some components of the spectral characteristic measuring device of FIG. 1.
Figure 2B:
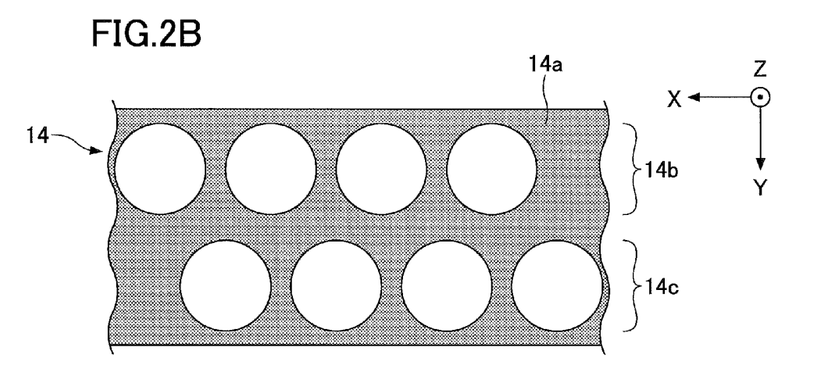

Preferably, the imaging optical system 12 may be implemented by image-side telecentric lenses (or has an image-side telecentric characteristic) so that light beams passing through first apertures 13b and second apertures 13c (see FIG. 2) of the hole array 13 efficiently enter first lenses 14b and second lenses 14c of the imaging optical system 14. This configuration makes it possible to prevent light beams passing through the first apertures 13b and the second apertures 13c from entering the wrong lenses (of the first lenses 14b and the second lenses 14c) and thereby makes it possible to reduce measurement errors.

Placing the imaging optical system 12, which is a reducing optical system, before the hole array 13 makes it possible to support various measurement widths and pitches using the same optical system. The imaging optical system 12 is an example of a second imaging unit of the present embodiment.

The hole array 13 includes a light-shielding part in which plural apertures are formed. The hole array divides diffuse reflection light entering via the imaging optical system 12 into plural diffuse reflection light beams. The imaging optical system 14 converges or focuses the respective diffuse reflection light beams entering via the hole array 13 onto the diffraction unit 15.

The diffraction unit 15 separates the respective diffuse reflection light beams converged by the imaging optical system 14 into spectral lights so that the spectral lights propagate in different directions according to their wavelengths and form diffraction images corresponding to the apertures of the hole array 13. The diffraction unit 15 may be implemented, for example, by a prism, a transmission grating, or a combination of them.

Preferably, the diffraction unit 15 may be implemented by blazed diffraction gratings. Using blazed diffraction gratings as the diffraction unit 15 makes it possible to improve the diffraction efficiency of 1st-order diffraction light that is focused on the line sensor 16 and thereby makes it possible to make 1st-order diffraction images brighter.

The line sensor 16 includes plural pixels that receive diffraction images formed by the diffraction unit 15, detect the light intensities of the diffraction images for respective wavebands, and convert the detected light intensities into electric signals. For example, the line sensor 16 may be implemented by a metal oxide semiconductor (MOS) device, a complimentary metal oxide semiconductor (CMOS) device, a charge coupled device (CCD), or a contact image sensor (CIS). The line sensor 16 is an example of a light receiving unit of the present embodiment.

Figure 2C:
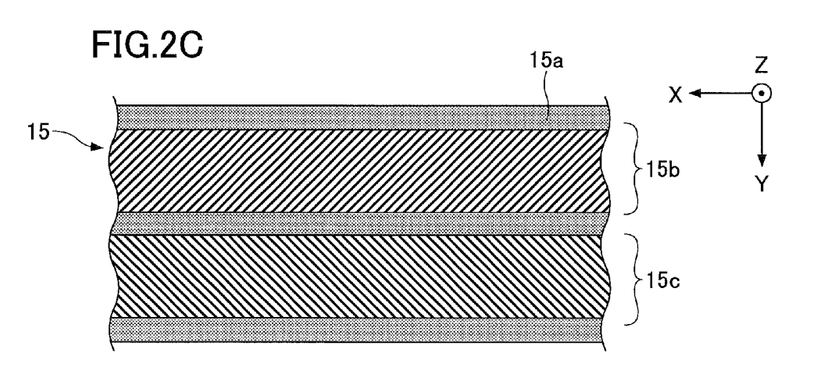

The hole array 13, the imaging optical system 14, the diffraction unit 15, and the line sensor 16 are described in more detail below with references to FIGS. 2 through 4. FIGS. 2A through 2C are drawings illustrating some components of the spectral characteristic measuring device 10 of FIG. 1. FIG. 2A illustrates the hole array 13 viewed from the Z-direction, FIG. 2B illustrates the imaging optical system 14 viewed from the Z-direction, and FIG. 2C illustrates the diffraction unit 15 viewed from the Z-direction.

As illustrated in FIG. 2A, the hole array 13 includes a light-shielding part 13a in which a first aperture array and a second aperture array are formed. The first aperture array includes plural first apertures 13b arranged in a line, and the second aperture array includes plural second apertures 13c arranged in a line. The first apertures 13b and the second apertures 13c are arranged alternately in a staggered pattern.

In other words, the first apertures 13b are arranged in a line along the X-direction, the second apertures 13c are also arranged in a line along the X-direction, and the positions of the first apertures 13b in the X-direction are shifted from the positions of the corresponding second apertures 13c to form a staggered pattern.

The hole array 13 divides diffuse reflection light, which is reflected from the medium 90 and enters the hole array 13 via the imaging optical system 12, into plural diffuse reflection light beams corresponding to the first apertures 13b and the second apertures 13c. For example, the hole array 13 may be prepared by forming the light-shielding part 13a, the first aperture array, and the second aperture array by selectively covering a transparent part such as a glass plate with a metal film or a black resin film. Alternatively, the hole array 13 may be prepared by forming the first aperture array and the second aperture array shaped like slits in the light-shielding part 13a made of a thin metal plate.

In the example of FIG. 2, the first apertures 13b and the second apertures 13c have a circular shape. However, the first apertures 13b and the second apertures 13c may have any other shape such as an oval shape, a rectangular shape, or a more complex shape.

With the hole array 13, it is possible to divide diffuse reflection light from a target object into plural diffuse reflection light beams by the first aperture array and the second aperture array and to block unnecessary parts of the diffuse reflection light. In other words, the hole array 13 makes it possible to detect only light beams on a focal plane that have passed through the first apertures 13b and the second apertures 13c and to prevent entry of reflected light from adjacent areas. The hole array 13 is an example of a light dividing unit according to the present embodiment.

Referring to FIG. 2B, the imaging optical system 14 includes first lenses 14b arranged in a line along the X-direction and second lenses 14c arranged in a line along the X-direction. The first lenses 14b and the second lenses 14c are arranged alternately in a staggered pattern. The imaging optical system 14 converges the respective diffuse reflection light beams entering via the hole array 13 onto the diffraction unit 15.

A shielding part 14a is formed in areas of the imaging optical system 14 other than the areas where the first lenses 14b and the second lenses 14c are provided. The shielding part 14a blocks light beams other than those entering the first lenses 14b and the second lenses 14c. The imaging optical system 14 is an example of a first imaging unit according to the present embodiment.

Referring to FIG. 2C, the diffraction unit 15 includes a substrate 15a in which a first diffraction region 15b and a second diffraction region 15c are formed. The diffraction axis directions of the first diffraction region 15b and the second diffraction region 15c are different from each other. Each of the first diffraction region 15b and the second diffraction region 15c has an elongated shape that extends in the X-direction. The first diffraction region 15b and the second diffraction region 15c are shifted from each other in the Y-direction, i.e., arranged in parallel with each other in the Y-direction.

Figure 3:
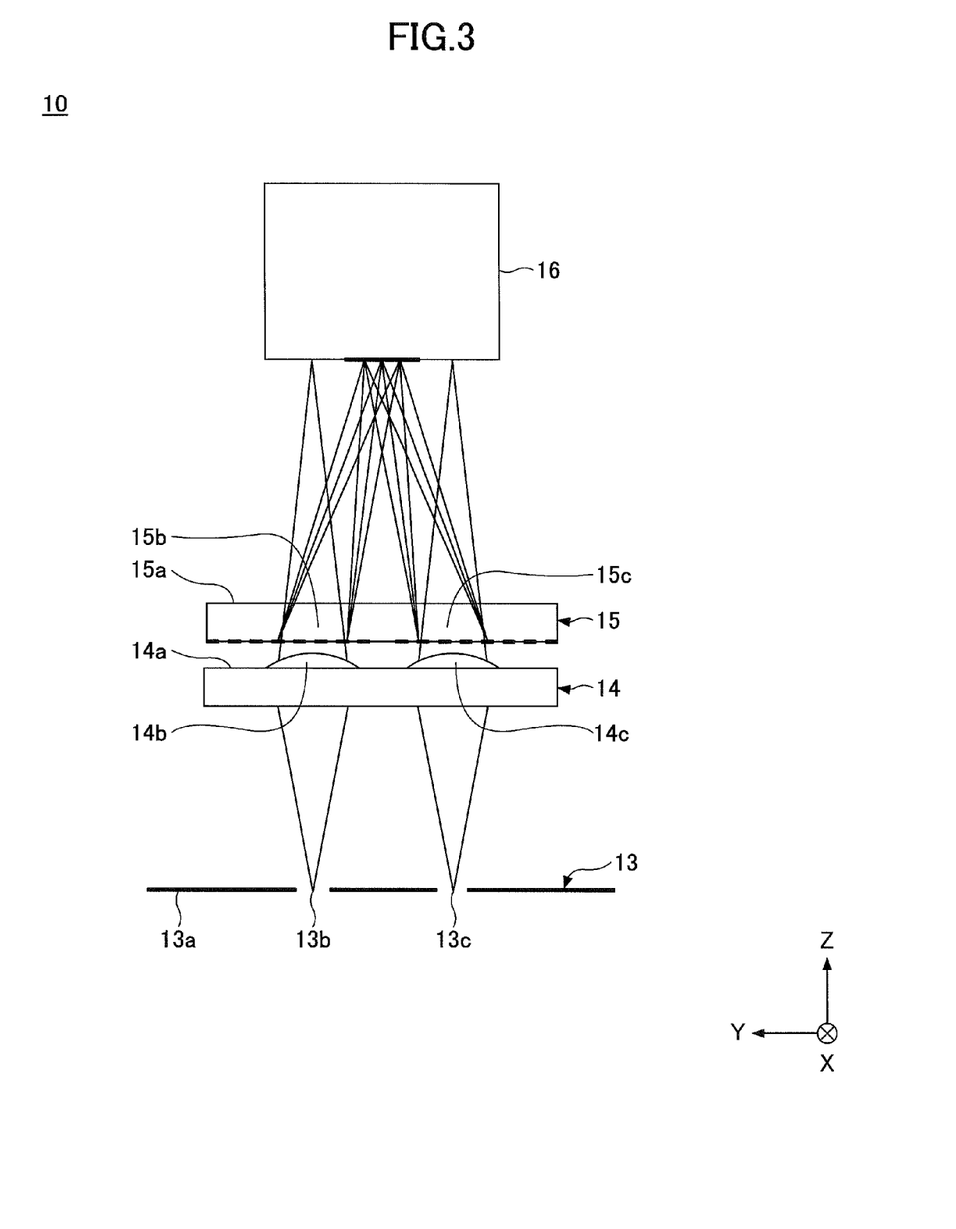
FIG. 3 is an enlarged view of a part of the spectral characteristic measuring device of FIG. 1 from a hole array to a line sensor.

FIG. 3 is an enlarged view of a part of the spectral characteristic measuring device 10 of FIG. 1 from the hole array 13 to the line sensor 16. As illustrated in FIG. 3, the first apertures 13b of the hole array 13, the first lenses 14b of the imaging optical system 14, and the first diffraction region 15b of the diffraction unit 15 correspond to each other. Similarly, the second apertures 13c of the hole array 13, the second lenses 14c of the imaging optical system 14, and the second diffraction region 15c of the diffraction unit 15 correspond to each other.

Figure 4:
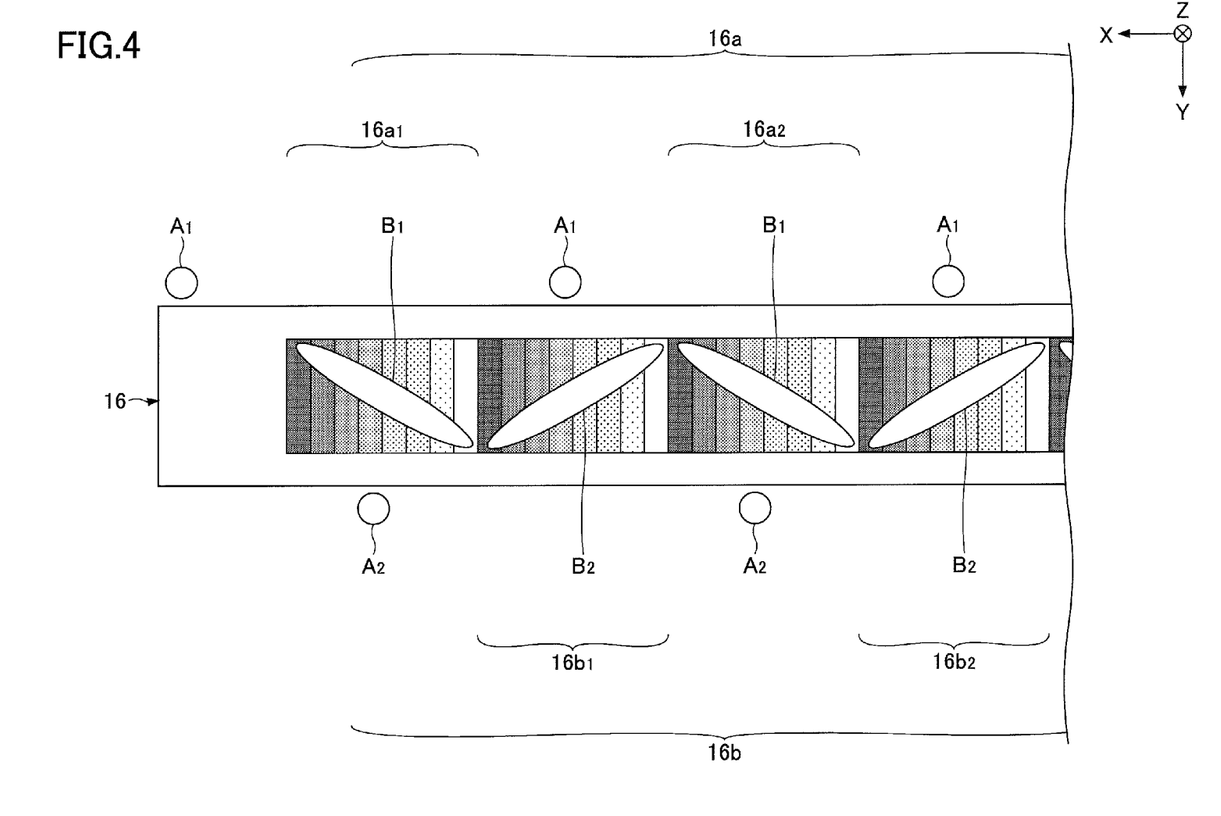
FIG. 4 is a drawing illustrating diffraction images entering a line sensor that are seen from the side of an incidence plane.

FIG. 4 is a drawing illustrating diffraction images entering the line sensor 16 that are seen from the side of the incidence plane. As illustrated in FIG. 4, the line sensor 16 has a pixel structure where pixels each having a light-receiving region that is long in the Y-direction are arranged in a line along the X-direction. The line sensor 16 includes spectral sensors $16_{a1}, 16_{b1}, 16_{a2}, 16_{b2}, \ldots$ each composed of N pixels that are adjacent to each other in the X-direction. The spectral sensors $16_{a1}, 16_{b1}, 16_{a2}, 16_{b2}, \ldots$ are arranged in the X-direction and constitute a spectral sensor array.

More specifically, each of the spectral sensors $16_{a1}, 16_{b1}, 16_{a2}, 16_{b2}, \ldots$ includes N pixels that are adjacent to each other in the X-direction and receive lights with different spectral characteristics. In the example of FIG. 4, each spectral sensor 16 includes eight pixels (one or more invalid pixels may be included in the eight pixels).

Diffraction images are formed on a first spectral sensor array 16a including the spectral sensors $16_{a1}, 16_{a2}, 16_{a3}, \ldots$ by the first apertures 13b of the hole array 13, the first lenses 14b of the imaging optical system 14, and the first diffraction region 15b of the diffraction unit 15. Meanwhile, diffraction images are formed on a second spectral sensor array 16b including the spectral sensors $16_{b1}, 16_{b2}, 16_{b3}, \ldots$ by the second apertures 13c of the hole array 13, the second lenses 14c of the imaging optical system 14, and the second diffraction region 15c of the diffraction unit 15.

In the descriptions below, for brevity, the first apertures 13b of the hole array 13, the first lenses 14b of the imaging optical system 14, and the first diffraction region 15b of the diffraction unit 15 may be collectively referred to as a "first spectral array"; and the second apertures 13c of the hole array 13, the second lenses 14c of the imaging optical system 14, and the second diffraction region 15c of the diffraction unit 15 may be collectively referred to as a "second spectral array".

As illustrated in FIG. 4, 0th-order diffraction images $A_1$ (transmission images) of the first spectral array are formed in non-imaging areas above the line sensor 16. Meanwhile, since the diffraction axis direction of the first diffraction region 15b of the diffraction unit 15 is oblique as illustrated in FIG. 2C, 1st-order diffraction images $B_1$ are formed on the pixels of the first spectral sensor array 16a (i.e., on the imaging area).

Similarly, 0th-order diffraction images $A_2$ (transmission images) of the second spectral array are formed in non-imaging areas below the line sensor 16. Meanwhile, since the diffraction axis direction of the second diffraction region 15c of the diffraction unit 15 is oblique and line-symmetrical to the diffraction axis direction of the first diffraction region 15b with respect to the X-axis as illustrated in FIG. 2C, 1st-order diffraction images $B_2$ are formed on the pixels of the second spectral sensor array 16b (i.e., on the imaging area). As described above, plural pixels are arranged in the X-direction in the imaging area of the line sensor 16 and each of the pixels has a light-receiving region that is long in the Y-direction. With this configuration, the line sensor 16 can receive the 1st-order diffraction images $B_1$ and $B_2$ that are dispersed in oblique directions.

It is possible to form all 1st-order diffraction images on the line sensor 16 by properly setting the pitch and the diffraction axis direction of the diffraction grating of each of the first diffraction region 15b and the second diffraction region 15c. That is, it is possible to convert diffraction images of the first spectral array and the second spectral array into signals by one line sensor 16.

Here, only the 1st-order diffraction images $B_1$ and $B_2$ corresponding to the first apertures 13b and the second apertures 13c of the hole array 13 are formed on the line sensor 16. The 0th-order diffraction images $A_1$ and $A_2$ (non-diffracted images), −1st order diffraction images, +2nd order diffraction images, and −2nd order diffraction images (not shown) are not used and formed at positions away from the pixels of the line sensor 16.

That is, the first apertures 13b and the second apertures 13c of the hole array 13 correspond to the first-order diffraction images $B_1$ and $B_2$ on the line sensor 16 (spectral sensors), and each of the first apertures 13b and the second apertures 13c is in an imaging relationship with the N pixels of the corresponding spectral sensor. This configuration makes it possible to accurately detect positions on the medium 90, i.e., a target object. In the descriptions below, +1st order diffraction images may be simply referred to as "diffraction images".

As described above, diffuse reflection light is divided by the first aperture array of the hole array 13 into plural diffuse reflection light beams, and the diffuse reflection light beams enter the first diffraction region 15b via the corresponding first lenses 14b. The diffuse reflection light beams entering the first diffraction region 15b propagate in different directions according to their wavelengths and form the first diffraction images $B_1$ corresponding to the first aperture array.

Similarly, diffuse reflection light is divided by the second aperture array of the hole array 13 into plural diffuse reflection light beams, and the diffuse reflection light beams enter the second diffraction region 15c via the corresponding second lenses 14c. The diffuse reflection light beams entering the second diffraction region 15c propagate in different directions according to their wavelengths and form the second diffraction images $B_2$ corresponding to the second aperture array.

The first diffraction images $B_1$ and the second diffraction images $B_2$ are formed on the pixels of the line sensor 16 such that they are arranged alternately in the direction (pixel arrangement direction) that the pixels are arranged. Also, the first diffraction images $B_1$ and the second diffraction images $B_2$ are slanted with respect to the pixel arrangement direction (X-direction). The slanting angle of the first diffraction images $B_1$ with respect to the pixel arrangement direction (X-direction) and the slanting angle of the second diffraction images $B_2$ with respect to the pixel arrangement direction (X-direction) are different from each other.

More specifically, the first diffraction images $B_1$ and the second diffraction images $B_2$ are line-symmetric with respect to an axis (Y-axis) that is orthogonal to the pixel arrangement direction (X-direction). In the present application, "line-symmetric" may indicate both "precisely symmetric with respect to a line" and "substantially symmetric with respect to a line".

For example, the diffuse reflection light beams in various wavebands received by the line sensor 16 are photoelectrically converted into signals corresponding to their light intensities, the signals are converted into digital signals, and the digital signals are sent to a computing unit (not shown). The computing unit may include a central processing unit (CPU), a read-only memory (ROM), and a main memory. For example, functions of the computing unit may be implemented by loading programs from the ROM into the main memory and executing the loaded programs by the CPU. A part or the entirety of the computing unit may be implemented by hardware only. Also, the computing unit may be composed of physically separate devices.

After a one-dimensional line of spectral information is sent to the computing unit, the medium 90 is moved relative to the spectral characteristic measuring device 10 in the direction of the arrow M in FIG. 1, the next one-dimensional line of spectral information is obtained by the line sensor 16 and sent to the computing unit. The spectral characteristic measuring device 10 measures colors of an entire image by repeating this process.

In the example of FIG. 1, the spectral characteristic measuring device 10 is configured as a 45/0 optical system where illuminating light emitted from the line illumination source 11 enters the medium 90 obliquely at 45 degrees and the line sensor 16 receives diffuse reflection light that is reflected from the medium 90 in the vertical direction. However, the configuration of the spectral characteristic measuring device 10 is not limited to that illustrated in FIG. 1. For example, the spectral characteristic measuring device may be configured as a 0/45 optical system where illuminating light emitted from the line illumination source 11 enters the medium 90 at a right angle and the line sensor 16 receives diffuse reflection light that is reflected from the medium 90 at 45 degrees.

In the spectral characteristic measuring device 10, the first spectral array and the second spectral array measure spectral reflectance of the medium 90 (or an image) at different positions that are shifted from each other in the moving direction (Y-direction) of the medium 90. To compensate for the influence of this shift, the computing unit may be configured to separate output signals of the first spectral array and the second spectral array and to shift the output signals of the first spectral array according to the moving speed of the medium 90 and the image scanning cycle of the line sensor 16 before calculating spectral reflectance for the first spectral array and the second spectral array. This configuration makes it possible to measure the spectral reflectance of a line of the medium 90 along the X-direction.

As described above, the spectral characteristic measuring device 10 of the first embodiment includes the hole array 13 having the first apertures 13b and the second apertures 13c that are arranged alternately in a staggered pattern, the imaging optical system 14 including the first lenses 14b and the second lenses 14c that are arranged alternately in a staggered pattern, and the diffraction unit 15 including the first diffraction region 15b and the second diffraction region 15c having different diffraction axis directions.

In the related-art spectral characteristic measuring device, lenses constituting an imaging optical system are arranged in a line. With this configuration, apertures (aperture diameters) of the lenses of the imaging optical system cannot be made greater than the pitch between spectral sensors constituting a line sensor and as a result, diffraction images formed on the line sensor become dark.

Meanwhile, in the spectral characteristic measuring device 10 of the first embodiment, the first lenses 14b and the second lenses 14c are arranged alternately in a staggered pattern. This configuration makes it possible to make the apertures (aperture diameters) of the first lenses 14b and the second lenses 14c greater than the pitch between the spectral sensors $16a_1$, $16b_1$, $16a_2$, and $16b_2$ and thereby makes it possible to improve the light use efficiency. This in turn makes it possible to form brighter diffraction images on the line sensor 16 and thereby obtain a sufficiently accurate signal within a short exposure time. Accordingly, the first embodiment makes it possible to provide a spectral characteristic measuring device that can measure spectral characteristics at high speed.

Also, using blazed diffraction gratings as the diffraction unit 15 makes it possible to improve the diffraction efficiency of diffraction light of a desired order and further improve the light use efficiency, and thereby makes it possible to provide a spectral characteristic measuring device that can measure spectral characteristics more accurately and at higher speed.

As described above, the shielding part 14a is formed in areas of the imaging optical system 14 other than the areas where the first lenses 14b and the second lenses 14c are provided. The shielding part 14a blocks light beams other than those entering the first lenses 14b and the second lenses 14c. This configuration makes it possible to greatly reduce stray light components resulting from multiple reflection and prevent unnecessary light from entering the line sensor 16. This in turn makes it possible to accurately and stably measure spectral characteristics.

<Variations of First Embodiment>

As a variation of the first embodiment, the hole array 13 and the imaging optical system 14 may be combined into a single unit. In describing the variation, descriptions overlapping those in the first embodiment are omitted.

Figure 5:
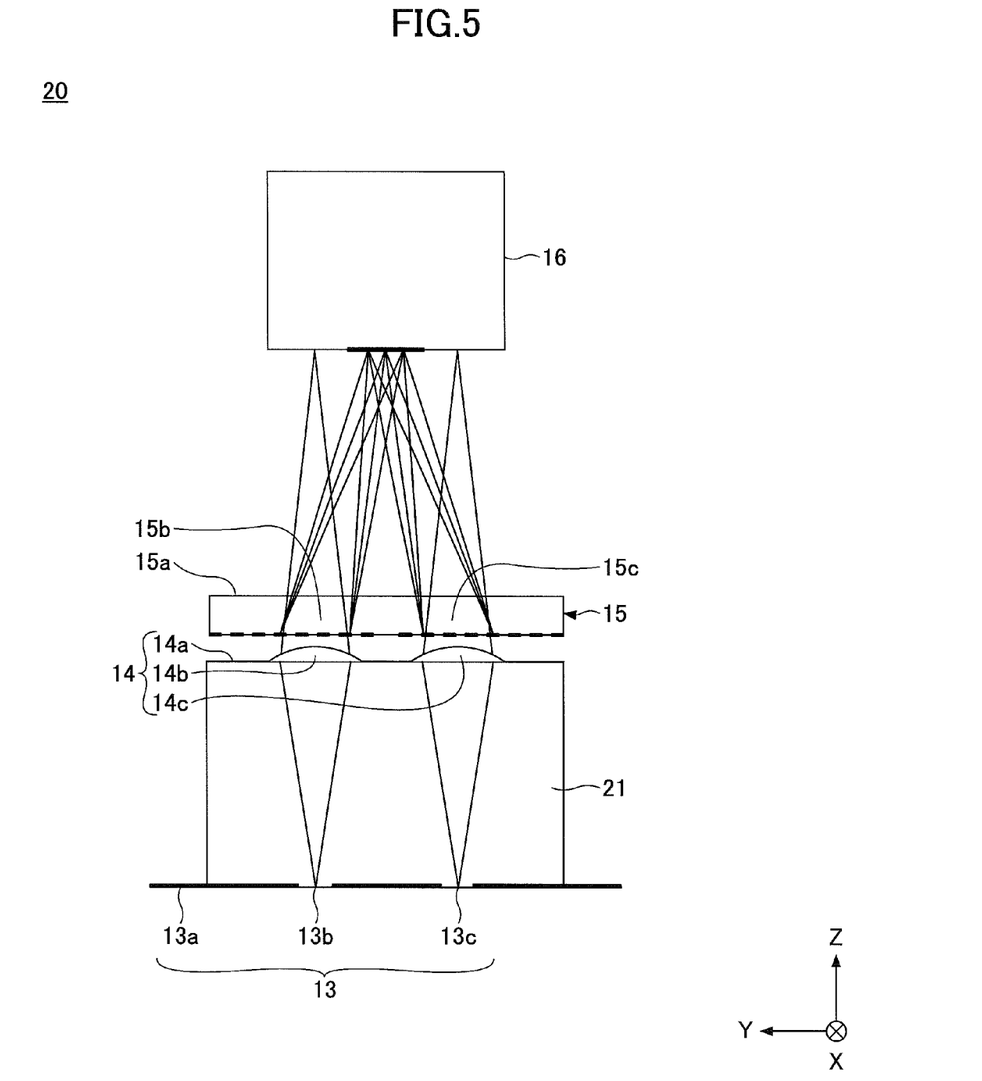
FIG. 5 is a schematic diagram of a spectral characteristic measuring device according to a variation of the first embodiment.

FIG. 5 is a schematic diagram of a spectral characteristic measuring device 20 according to a variation of the first embodiment. In FIG. 5, the line illumination source 11 and the imaging optical system 12 are omitted since they have substantially the same configurations as those of the spectral characteristic measuring device 10 of the first embodiment.

As illustrated in FIG. 5, in the spectral characteristic measuring device 20, the hole array 13 is disposed on an incidence surface (where diffuse reflection light enters) of a substrate 21 and the imaging optical system 14 is disposed on an exit surface (from which diffuse reflection light exits) of the substrate 21. Thus, the hole array 13 and the imaging optical system 14 are combined into a single unit. The substrate 21 may be made of, for example, a glass or plastic material that is transparent with respect to the illuminating light of the line illumination source 11. The substrate 21 is an example of an optical part according to the present embodiment.

With the above configuration, the spectral characteristic measuring device 20 can be made smaller than the spectral characteristic measuring device 10. The above configuration also makes it possible to prevent changes in the relative positions of the first openings 13b and the second openings 13c of the hole array 13 and the first lenses 14b and the second lenses 14c of the imaging optical system 14, and thereby makes it possible to prevent measurement errors resulting from vibrations, environmental changes, and changes over time.

Figure 6:
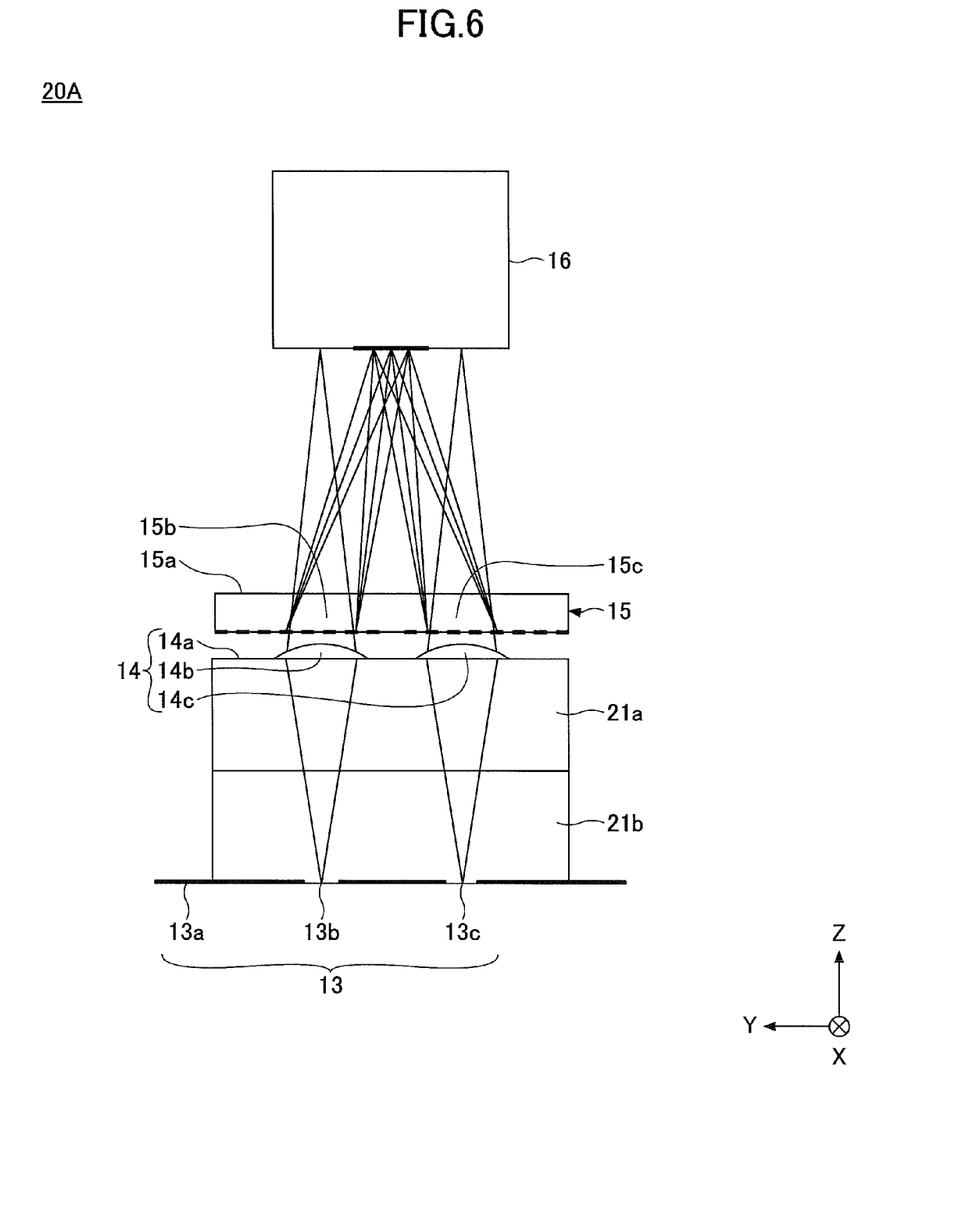
FIG. 6 is a schematic diagram of a spectral characteristic measuring device according to another variation of the first embodiment.

FIG. 6 illustrates a spectral characteristic measuring device 20A according to another variation of the first embodiment. In the spectral characteristic measuring device 20A, the hole array 13 is formed on one side of a substrate 21b, the imaging optical system 14 is formed on one side of a substrate 21a, and the opposing sides (i.e., the other sides) of the substrate 21b and the substrate 21a are joined together with, for example, an adhesive. The substrates 21a and 21b are examples of optical parts according to the present embodiment.

<Second Embodiment>

A spectral characteristic measuring device according to a second embodiment includes a light deflecting unit including first deflection parts and second deflection parts that have different deflection directions and are arranged alternately in a line. In the second embodiment, descriptions overlapping those in the first embodiment are omitted.

Figure 7:
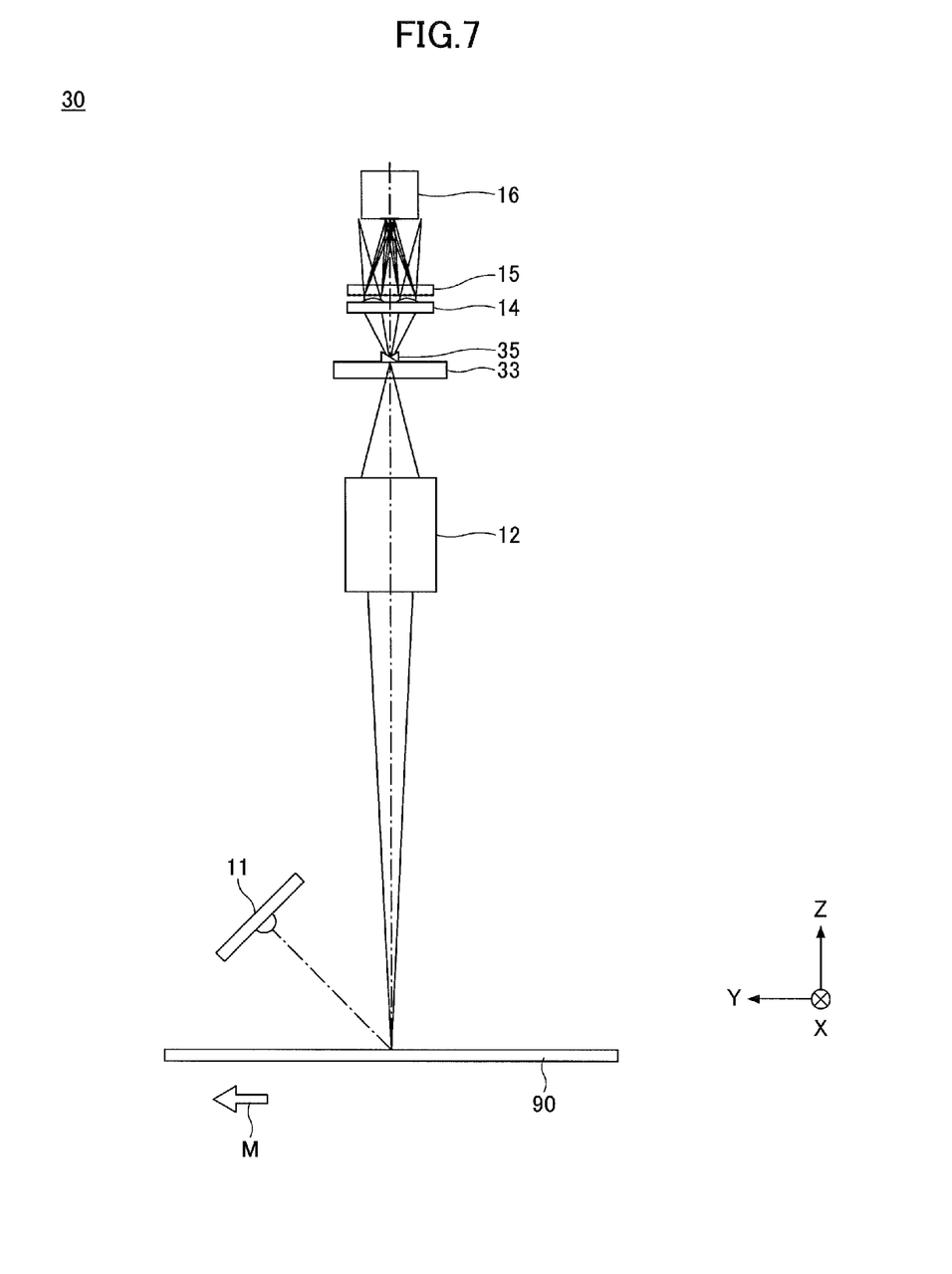
FIG. 7 is a schematic diagram of a spectral characteristic measuring device according to a second embodiment.
Figure 8A:
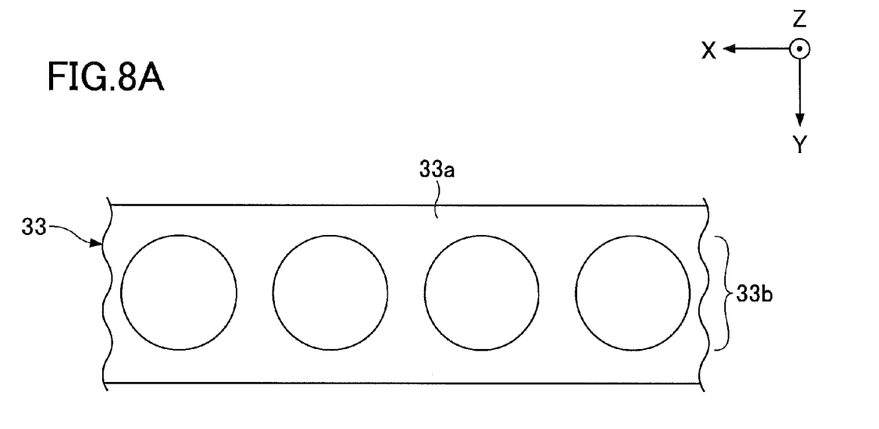
FIGS. 8A and 8B are drawings illustrating some components of the spectral characteristic measuring device of FIG. 7.
Figure 8B:
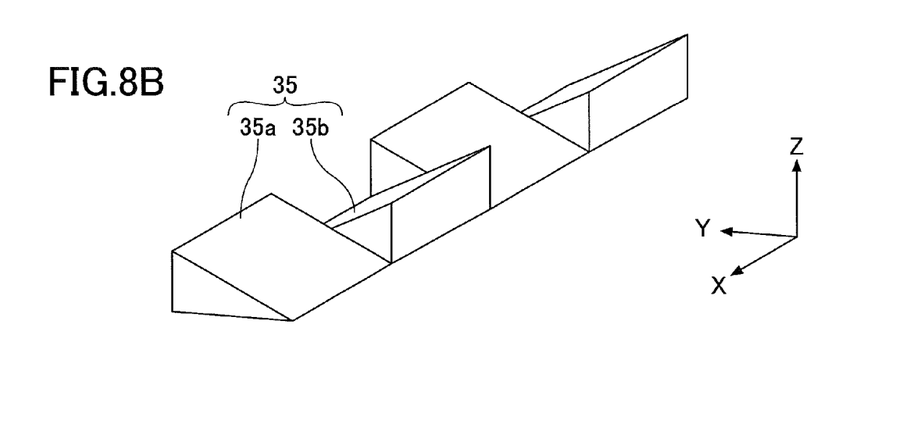
Figure 9:
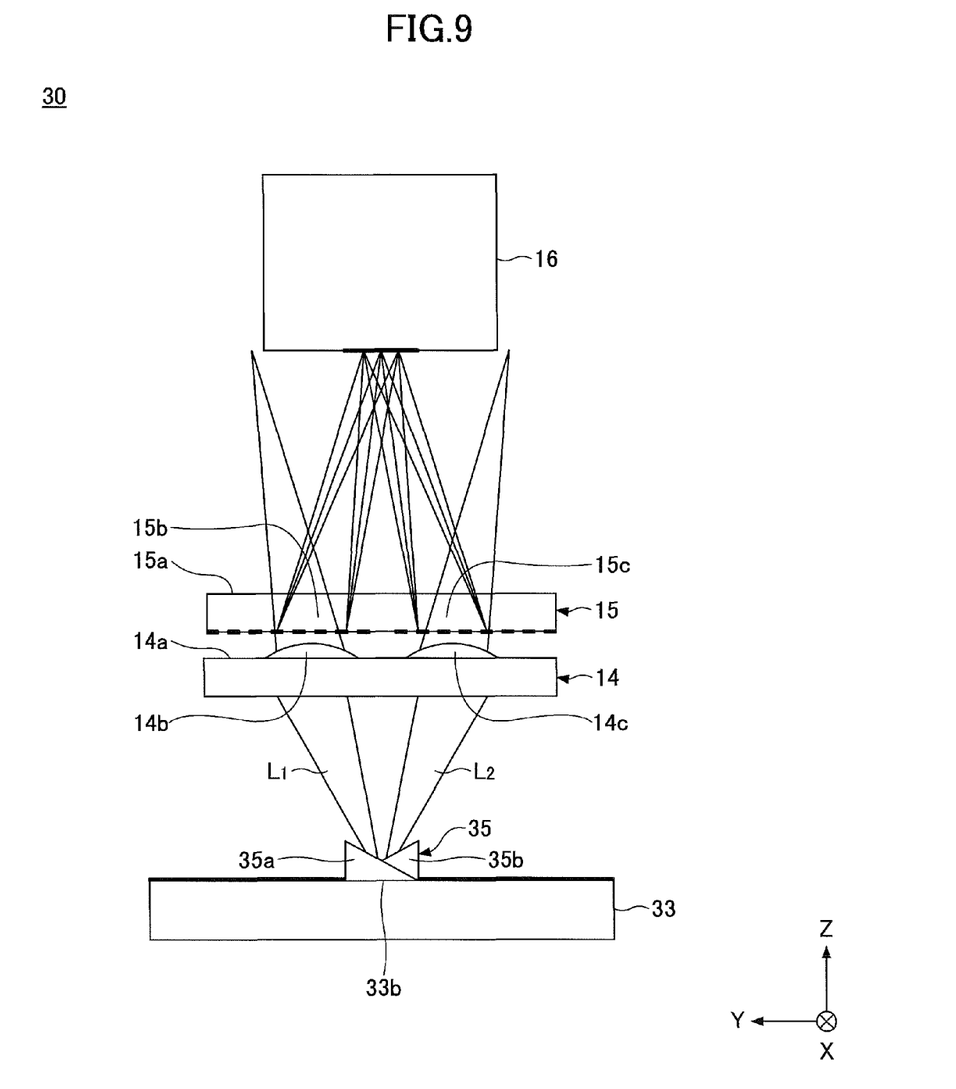
FIG. 9 is an enlarged view of a part of the spectral characteristic measuring device of FIG. 7 from a hole array to a line sensor.

FIG. 7 is a schematic diagram of a spectral characteristic measuring device 30 according to the second embodiment. FIGS. 8A and 8B are drawings illustrating some components of the spectral characteristic measuring device 30 of FIG. 7. FIG. 8A illustrates a hole array 33 viewed from the Z-direction, and FIG. 8B illustrates a microprism array 35. FIG. 9 is an enlarged view of a part of the spectral characteristic measuring device 30 of FIG. 7 from the hole array 33 to the line sensor 16.

Referring to FIGS. 7 through 9, the spectral characteristic measuring device 30 of the second embodiment is different from the spectral characteristic measuring device 10 of the first embodiment (see FIGS. 1 and 2) in that the hole array 13 is replaced with the hole array 33 and the microprism array 35 is provided immediately after (or downstream of) apertures 33b of the hole array 33.

The hole array 33 includes a light-shielding part 33a and apertures 33b (aperture array) formed in the light-shielding part 33a and arranged in a line along the X-direction. The hole array 33 divides diffuse reflection light entering via the imaging optical system 12 into plural diffuse reflection light beams. The hole array 33 is an example of a light dividing unit according to the present embodiment.

The microprism array 35 is disposed immediately after the openings 33b of the hole array 33. The microprism array 35 includes microprisms 35a that deflect entering diffuse reflection light beams toward the first lenses 14b and microprisms 35b that deflect entering diffuse reflection light beams toward the second lenses 14c. The microprisms 35a and the microprisms 35b are arranged alternately in a line along the X-direction.

Each of the microprisms 35a corresponds to one of the apertures 33b, and each of the microprisms 35b corresponds to one of the apertures 33b. For example, when a first microprism 35a corresponds to a first aperture 33b, a first microprism 35b adjacent to the first microprism 35a corresponds to a second aperture 33b that is adjacent to the first aperture 33b.

A light beam $L_1$ from the first aperture 33b enters the first microprism 35a and is deflected toward the corresponding first lens 14b of the imaging optical system 14. The light beam $L_1$ passes through the first lens 14b, is dispersed by the first diffraction region 15b of the diffraction unit 15, and enters the imaging area of the line sensor 16.

Meanwhile, a light beam $L_2$ from the second aperture 33b enters the first microprism 35b that is adjacent to the first microprism 35a, and is deflected toward the corresponding second lens 14c of the imaging optical system 14. The light beam $L_2$ passes through the second lens 14c, is dispersed by the second diffraction region 15c of the diffraction unit 15, and enters the imaging area of the line sensor 16.

The microprism array 35 is an example of a light deflecting unit according to the present embodiment. The microprisms 35a and 35b are examples of first and second deflection parts according to the present embodiment.

As described above, in the spectral characteristic measuring device 30 of the second embodiment, the light beams $L_1$ and $L_2$ propagating in different directions are generated by deflecting the optical axis of incident light with the microprisms 35a and 35b of the microprism array 35. This configuration makes it possible to arrange the first lenses 14b and the second lenses 14c alternately in a staggered pattern and thereby makes it possible to make the apertures (aperture diameters) of the first lenses 14b and the second lenses 14c greater than the pitch between the spectral sensors $16a_1$, $16b_1$, $16a_2$, and $16b_2$ to improve the light use efficiency. This in turn makes it possible to form brighter diffraction images on the line sensor 16 and thereby obtain a sufficiently accurate signal within a short exposure time. Accordingly, the second embodiment also makes it possible to provide a spectral characteristic measuring device that can measure spectral characteristics at high speed.

The configuration of the second embodiment also makes it possible to offset the optical axis shift caused by the microprism array 35 by the optical axis shift of 1st-order diffraction light. This in turn makes it possible to form 1st-order diffraction images of the light beams $L_1$ and $L_2$, which exit from the apertures 33b of the hole array 33 arranged in a line, on a row of spectral sensors of the line sensor 16 by using two rows of optical systems (i.e., the first lenses 14b and the second lenses 14c of the imaging optical system 14, and the first diffraction region 15b and the second diffraction region 15c of the diffraction unit 15).

Accordingly, the configuration of the second embodiment makes it possible to measure the spectral characteristics of one line of the medium 90 at once. Further, the configuration of the second embodiment eliminates the need to compensate for the difference in measurement positions in the moving direction of the medium 90 by using the computing unit. This in turn makes it possible to reduce the processing load of the computing unit and thereby makes it possible to provide a spectral characteristic measuring unit at a lower cost.

<Third Embodiment>

In a third embodiment, an image forming apparatus including the spectral characteristic measuring device 10 of the first embodiment is provided. In the third embodiment, descriptions overlapping those in the first and second embodiments are omitted.

Figure 10:
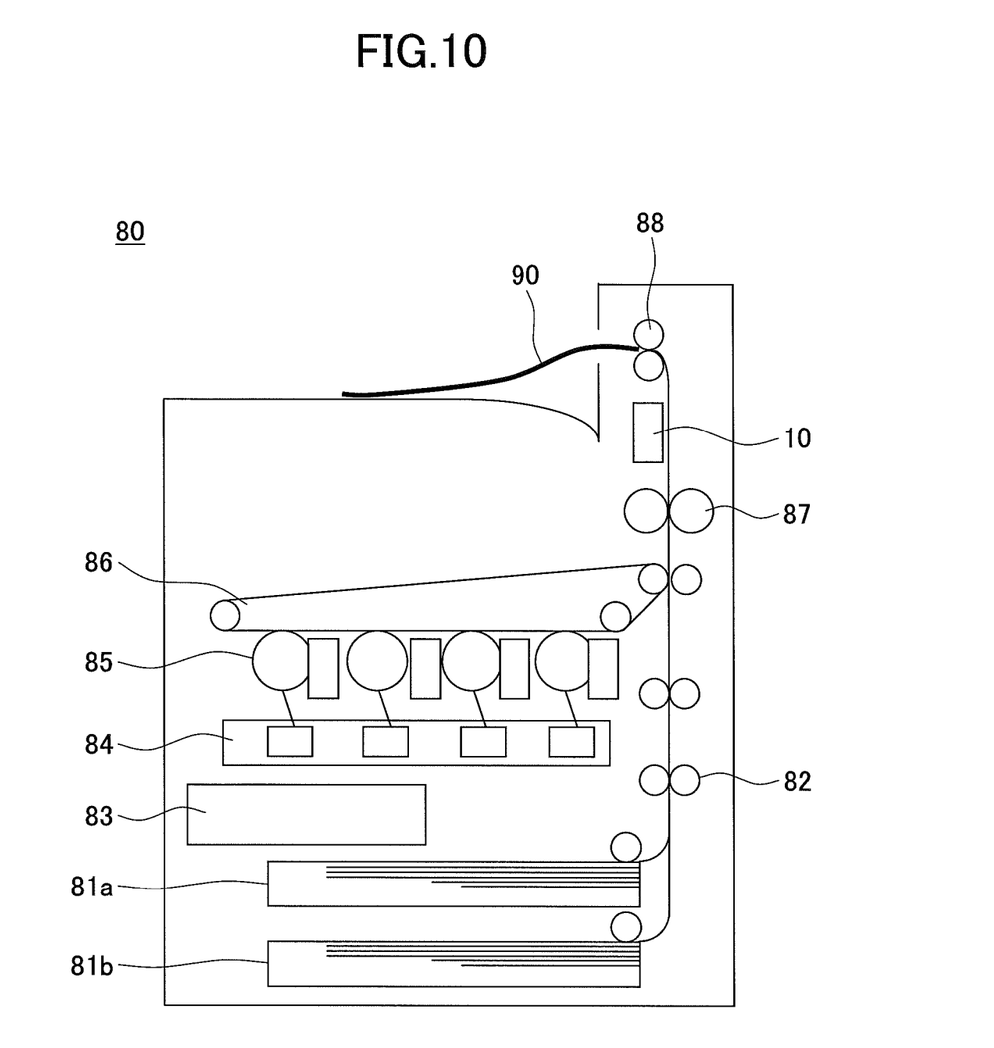
FIG. 10 is a schematic diagram of an image forming apparatus according to a third embodiment.

FIG. 10 is a schematic diagram of an image forming apparatus 80 according to the third embodiment. As illustrated in FIG. 10, the image forming apparatus 80 includes the spectral characteristic measuring device 10 of the first embodiment, a paper-feed cassette 81a, a paper-feed cassette 81b, paper feeding rollers 82, a controller 83, an optical scanning system 84, photoconductors 85, an intermediate transfer part 86, fusing rollers 87, and paper ejecting rollers 88. In FIG. 10, "90" indicates a medium such as paper.

In the image forming apparatus 80, the medium 90 is fed from the paper-feed cassette 81a or 81b via a guide (not shown) and the paper feeding rollers 82 to the intermediate transfer part 86. Meanwhile, the photoconductors 85 are exposed by the optical scanning system 84 to form latent images and the latent images are developed with color materials (e.g., toner). The developed images are transferred onto the intermediate transfer part 86, and then transferred from the intermediate transfer part 86 onto the medium 90. The transferred image on the medium 90 is fused by the fusing rollers 87 and the medium 90 with the fused image is ejected by the paper ejecting rollers 88. The spectral characteristic measuring device 10 is disposed downstream of the fusing rollers 87.

Thus, in the image forming apparatus 80 of the third embodiment, the spectral characteristic measuring device 10 is provided in an appropriate position to obtain two-dimensional color information of a surface of the medium 90 in synchronization with the movement of the medium 90. In the example of FIG. 10, it is assumed that the image forming apparatus 80 is an electrophotographic image forming apparatus. In this case, based on the obtained two-dimensional color information, the image forming apparatus 80 can control the output of a light source of a writing optical scanning system during each scan path and perform image processing such as gamma correction before printing to reduce color irregularity on the surface of a medium.

Meanwhile, when the image forming apparatus 80 is an inkjet image forming apparatus, the image forming apparatus 80 can control the amount of jetted ink at respective head positions based on the obtained two-dimensional color information and thereby reduce color irregularity on the surface of a medium.

Also, with the spectral characteristic measuring device 10, it is possible to measure the spectral reflectance of a printed image and to obtain color measurements such as tristimulus values XYZ and CIELAB values based on the measured spectral reflectance. The color measurements may be used to monitor a printing process and thereby stably produce images with accurate colors. For example, a printing process may be stopped or adjusted based on changes in the color measurements.

The spectral characteristic measuring device 10 of the image forming apparatus 80 may be replaced with the spectral characteristic measuring device 20, 20A, or 30.

Spectral characteristic measuring devices and an image forming apparatus according to preferred embodiments are described above. However, the present invention is not limited to the specifically disclosed embodiments, and variations and modifications may be made without departing from the scope of the present invention.

In the above embodiments and variations, the spectral characteristic measuring device 10 (20, 20A, 30) is used to measure the spectral characteristics of reflection light from a medium such as paper and thereby to obtain spectral reflectance of the medium. However, the present invention is not limited to the above embodiments and variations. For example, the present invention may be applied to an apparatus for measuring spectral characteristics of a screen of a display unit such as a liquid-crystal display.

Also, the present invention may be applied to an evaluation apparatus for determining the authenticity and types of bills and credit cards. Further, the present invention may be applied to an image evaluation apparatus for evaluating images printed on materials (e.g., plastic) other than paper.

What is claimed is:

1. A spectral characteristic measuring device, comprising:
an illuminating unit configured to illuminate a medium;
a light dividing unit configured to divide reflection light from the medium into plural reflection light beams;
a first imaging unit configured to focus the respective reflection light beams;
a diffraction unit configured to diffract the focused reflection light beams to form diffraction images; and
a light receiving unit including plural pixels configured to receive the diffraction images,
wherein the first imaging unit includes first lenses and second lenses that are arranged alternately in a staggered pattern;
wherein the diffraction unit includes a first diffraction region and a second diffraction region; and
wherein the spectral characteristic measuring device is configured such that
the reflection light beams focused by the first lenses enter the first diffraction region to form first diffraction images of the diffraction images,
the reflection light beams focused by the second lenses enter the second diffraction region to form second diffraction images of the diffraction images, and
the first diffraction images and the second diffraction images are arranged alternately on the light receiving unit in a pixel arrangement direction in which the pixels are arranged.

2. The spectral characteristic measuring device as claimed in claim 1, wherein
the light dividing unit includes first apertures and second apertures that are arranged alternately in a staggered pattern; and
the light dividing unit is configured such that the reflection light beams passing through the first apertures enter the first lenses and the reflection light beams passing through the second apertures enter the second lenses.

3. The spectral characteristic measuring device as claimed in claim 1, further comprising:
an optical part,
wherein the light dividing unit is disposed on an incidence surface of the optical part and the first imaging unit is disposed on an exit surface of the optical part.

4. The spectral characteristic measuring device as claimed in claim 1, wherein the first diffraction images correspond to positions on the medium that are different from positions on the medium corresponding to the second diffraction images.

5. The spectral characteristic measuring device as claimed in claim 1, further comprising:
a light deflecting unit disposed downstream of the light dividing unit and including first deflection parts and second deflection parts that are arranged alternately in a line and have different deflection directions,
wherein the light dividing unit includes apertures that are arranged in a line; and
wherein the light deflecting unit is configured such that
one of the reflection light beams passing through one of an adjacent pair of the apertures is deflected by one of the first deflection parts and enters one of the first lenses, and
one of the reflection light beams passing through another one of the adjacent pair of the apertures is deflected by one of the second deflection parts and enters one of the second lenses.

6. The spectral characteristic measuring device as claimed in claim 1, wherein the first diffraction images are slanted at a first slanting angle with respect to the pixel arrangement direction and the second diffraction images are slanted at a second slanting angle, which is different from the first slanting angle, with respect to the pixel arrangement direction.

7. The spectral characteristic measuring device as claimed in claim 6, wherein the first diffraction images and the second diffraction images are line-symmetric with respect to an axis that is orthogonal to the pixel arrangement direction.

8. The spectral characteristic measuring device as claimed in claim 1, wherein the first imaging unit includes a light-shielding part that blocks light other than the reflection light beams entering the first lenses and the second lenses.

9. The spectral characteristic measuring device as claimed in claim 1, wherein the first diffraction region and the second diffraction region are implemented by blazed diffraction gratings with high diffraction efficiency for a diffraction light of a specific order.

10. The spectral characteristic measuring device as claimed in claim 1, further comprising:
   a second imaging unit configured to focus the reflection light from the medium on the light dividing unit,
   wherein the second imaging unit has an image-side telecentric characteristic.

11. An image forming apparatus, comprising:
   the spectral characteristic measuring device of claim 1 configured to measure spectral characteristics of a surface of a medium on which an image is formed.

* * * * *